(12) United States Patent
Porter, II et al.

(10) Patent No.: US 7,281,742 B2
(45) Date of Patent: Oct. 16, 2007

(54) VEHICLE COMPARTMENT DIVIDER

(75) Inventors: Terence Porter, II, Westland, MI (US); Koshorkumar M. Kale, Farmington Hills, MI (US); Ryan Rumberger, Canton, MI (US)

(73) Assignee: Nissan Technical Center North America, Inc. MI (US)

( * ) Notice: Subject to any disclaimer, the term of this patent is extended or adjusted under 35 U.S.C. 154(b) by 0 days.

(21) Appl. No.: 11/046,860

(22) Filed: Feb. 1, 2005

(65) Prior Publication Data

US 2006/0170236 A1  Aug. 3, 2006

(51) Int. Cl.
*B60R 7/02* (2006.01)

(52) U.S. Cl. ............... 296/24.4; 296/37.16; 296/24.43

(58) Field of Classification Search ............... 296/24.4, 296/24.43, 37.16
See application file for complete search history.

(56) References Cited

U.S. PATENT DOCUMENTS

| | | | | |
|---|---|---|---|---|
| 3,951,446 A | * | 4/1976 | Zehnder et al. | 296/37.16 |
| 4,688,842 A | * | 8/1987 | Arbenius | 296/24.43 |
| 5,392,972 A | * | 2/1995 | Caruso et al. | 224/42.34 |
| 6,050,115 A | * | 4/2000 | Schroter et al. | 70/107 |
| 6,341,820 B1 | * | 1/2002 | Kimura et al. | 297/378.13 |
| 6,460,912 B2 | | 10/2002 | Moore et al. | |
| 6,467,828 B1 | | 10/2002 | Grydbeck et al. | |
| 6,752,304 B1 | | 6/2004 | Hotary et al. | |
| 6,796,472 B2 | | 9/2004 | Miller | |
| 2003/0057724 A1 | * | 3/2003 | Inagaki et al. | 296/37.8 |
| 2003/0116989 A1 | * | 6/2003 | Guanzon et al. | 296/37.16 |
| 2003/0122394 A1 | * | 7/2003 | Hashimoto | 296/24.1 |

FOREIGN PATENT DOCUMENTS

EP  0864466  * 9/1998

* cited by examiner

*Primary Examiner*—Dennis H. Pedder
(74) *Attorney, Agent, or Firm*—Global IP Counselors

(57) ABSTRACT

A vehicle compartment structure includes a vehicle storage compartment defining a storage area with a floor. A rigid compartment divider is pivotally coupled to the floor of the storage compartment between a first substantially horizontal storage position and a second substantially vertical dividing position. In the horizontal storage position, the storage area is substantially unobstructed by the rigid compartment divider. In the second substantially vertical dividing position, the compartment divider divides the storage compartment into two separate spaces.

25 Claims, 15 Drawing Sheets

VEHICLE COMPARTMENT DIVIDER

BACKGROUND OF THE INVENTION

1. Field of the Invention

The present invention generally relates to a vehicle compartment divider. More specifically, the present invention relates to a vehicle compartment divider for dividing a vehicle compartment into two distinct and separate spaces.

2. Background Information

In recent years, vehicles have become more than devices for transportation. The automotive industry is constantly providing many additional options and/or conveniences to the driver and passengers. Moreover, drivers are demanding more features in vehicles to accommodate their specific lifestyles, business and transportation needs. One area of the vehicle that has been significant improved is the storage area of the vehicle. The automotive industry is constantly developing new innovative ways to provide additional and/or more useful and convenient storage areas in the vehicle.

For example, U.S. Pat. No. 6,752,304 to Hotary et al. discloses a rear cargo storage assembly that includes a small storage compartment within the rear floor portion of a vehicle covered by two removable lid portions. The two lid portions lay flat in a horizontal orientation to cover the small storage compartment but can be lifted up and arranged in a vertical orientation so that grocery bags and/or other cargo can be supported therebetween. One disadvantage of the storage compartment disclosed in this patent is that the storage compartment under the two lid portions can only hold very small items with the lids covering the storage space. Moreover, due to the construction of the storage compartment being recessed with the floor, this type of storage compartment may not be well suited for vehicles that have a confined trunk area, such as a sedan.

Vehicles with trunks usually have a trunk that is a single large undivided area for storage. This single large undivided area allows for storage of both large and small items. However, small items tend to slide around in the large trunk area while the vehicle is moving. Thus, many different solutions have been proposed to overcome this problem. One of the most common solutions to this problem is the use of a flexible barrier such as a net. The flexible barriers are very useful in confining small items to a smaller area of the truck, and increase the flexibility and utility of the cargo space of the trunk. However, some of these flexible barriers are sometimes difficult to install and offer very few other advantages.

Also rigid compartment dividers have been proposed to increase the flexibility and utility of the cargo space of the trunk. While the rigid compartment dividers offer some additional benefits over a flexible barrier, the rigid compartment divider can also have other types of disadvantages. Some of rigid compartment dividers are very complex, which can make them costly to manufacture and/or install. Moreover, some of the rigid compartment dividers make it impossible to carrier large items without removing the rigid compartment divider. One example of a rigid compartment divider is disclosed in U.S. Pat. No. 6,796,472 to Miller.

There is a need for a storage compartment divider that has more utility than the prior art, is more aesthetically pleasing and allows for more versatile storage arrangements.

In leisure excursions, there is often a need for a driver to put wet materials, such as swimming suits, fishing gear or wet suits in the trunk of a vehicle. However, the moisture on these items can stain the inside of a trunk of a vehicle and can stain and or damage other items stored in the trunk. Clearly, there is a need to keep wet or moist items loaded in the trunk of a car separate from those items that should be kept separate from the wet items.

In view of the above, it will be apparent to those skilled in the art from this disclosure that there exists a need for an improved vehicle compartment divider. This invention addresses this need in the art as well as other needs, which will become apparent to those skilled in the art from this disclosure.

SUMMARY OF THE INVENTION

One object of the present invention is to provide a vehicle storage compartment with a divider that improves the versatility of the storage compartment space.

Another object of the present invention is to provide a vehicle storage compartment with a divider that can easily be removed from the storage compartment without the use of tools to increase the storage capacity of the storage compartment.

Another object of the present invention is to provide a vehicle storage compartment with a divider that includes a waterproof tray for holding wet or moist items separate from dry items.

Yet another object of the present invention is to provide a vehicle storage compartment with a divider that divides the storage compartment into two separate storage spaces.

The foregoing objects can basically be achieved by providing a vehicle compartment structure that includes a vehicle storage compartment defining a storage area with a floor, and a rigid compartment divider pivotally coupled to the floor of the storage compartment between a first substantially horizontal storage position in which the storage area is substantially unobstructed by the rigid compartment divider and a second substantially vertical dividing position in which the rigid compartment divider divides the storage compartment into two separate spaces.

The rigid compartment divider can further be coupled to the vehicle storage compartment by a mounting structure that is configured and arranged such that the rigid compartment divider is removable from the storage compartment without using tools.

The rigid compartment divider can further be arranged within the storage compartment such that with the rigid compartment divider in the vertical dividing position one of the two separate spaces is concealed and partitioned from the remaining trunk storage space.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
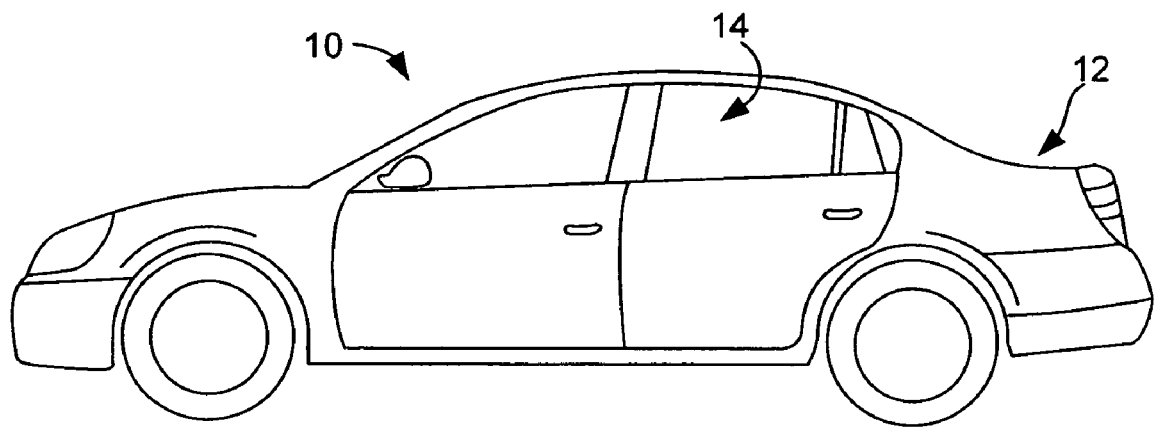
FIG. 1 is a side elevational view of a vehicle having a storage compartment structure with a compartment divider in accordance with one embodiment of the present invention.
Figure 2:
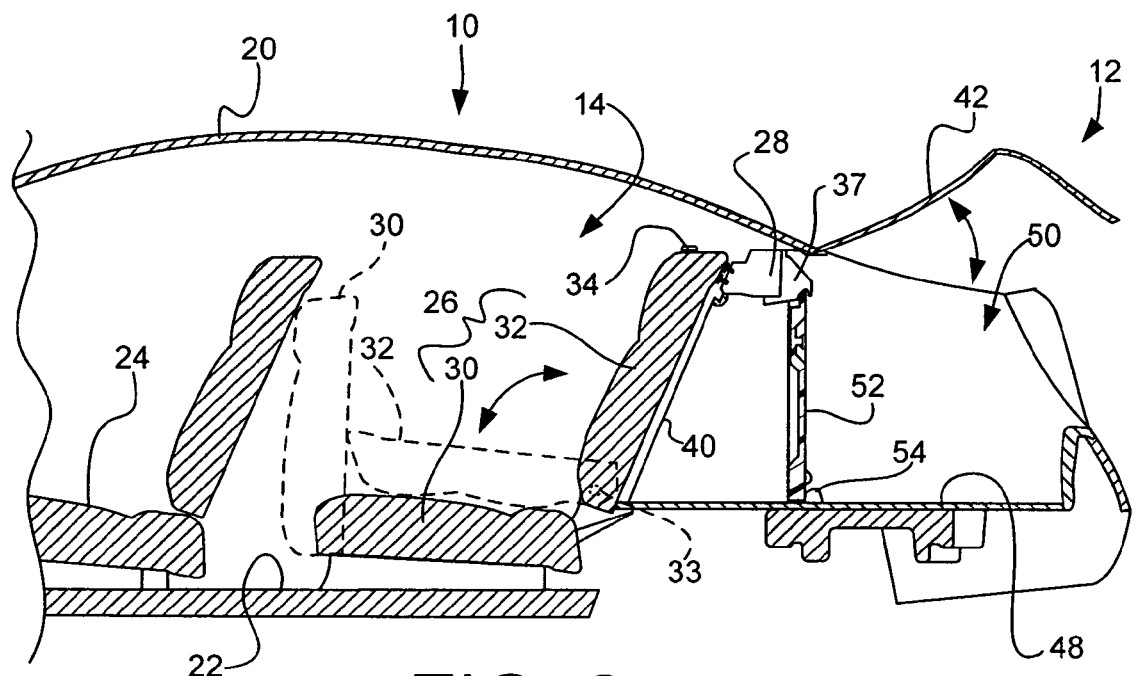
FIG. 2 is a simplified partial longitudinal cross-sectional view of the vehicle depicted in FIG. 1 showing a portions of the passenger compartment, and the storage compartment structure with the compartment divider installed therein in accordance with the present invention.
Figure 3:
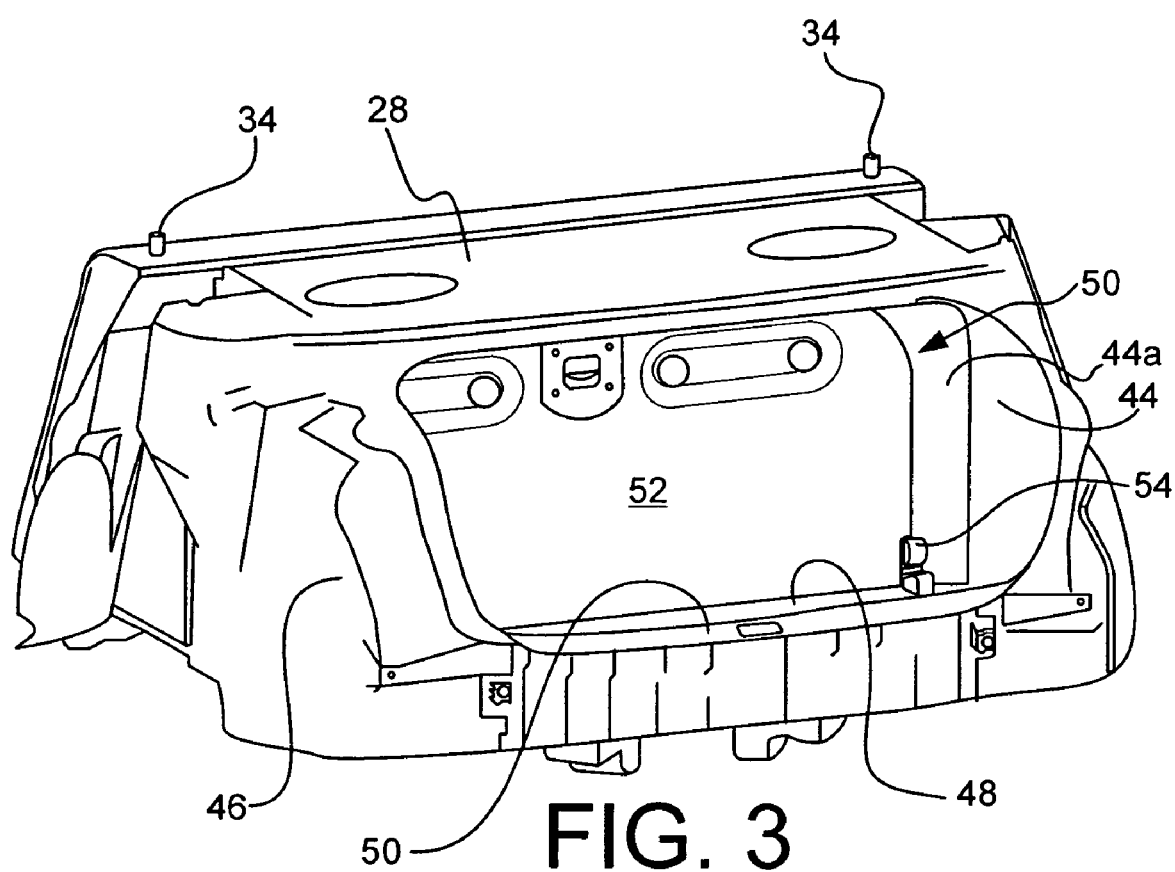
FIG. 3 is a simplified perspective view of the storage compartment structure of the vehicle depicted in FIGS. 1 and 2, with fenders and other portions of the vehicle removed to reveal the compartment divider and portions of the storage compartment structure in accordance with the present invention.

Referring initially to FIGS. 1-3, a vehicle 10 is illustrated that has a storage compartment structure 12 in accordance with a first embodiment of the present invention. In this embodiment, the storage compartment structure 12 is part of the rear trunk area of the vehicle 10 that is separated from a passenger compartment 14. The storage compartment structure 12 is best shown in FIGS. 2 and 3 described in greater detail below. The fenders, frame, support structures, suspension, tires and transaxle of the vehicle 10 are conventional components that are well known in the art. Since these portions of a vehicle (and other portions) are well known in the art, these structures are not discussed or illustrated in detail herein.

Referring now to FIG. 2, the passenger compartment 14 is basically defined by a roof 20, a floor 22, a front seat 24, a rear seat 26 and a rear window support portion 28. The precise structure of the passenger compartment 14 is not critical to the present invention, except to the extent necessary to define the storage compartment structure 12. Thus, the passenger compartment 14 will be simplified for the purpose of illustration and a detailed description of its parts will be omitted.

The rear seat 26 basically includes a lower seat portion 30 and a seatback portion 32. The lower seat portion 30 and the seatback portion 32 are both pivotally mounted to the floor 22 of the passenger compartment 14. The lower seat portion 30 is moveable between a sitting position shown in solid lines in FIG. 2 and a forward position shown in dashed lines in FIG. 2. The seatback portion 32 is movable between an upright position shown with solid lines in FIG. 2 and a lowered position shown in dashed lines in FIG. 2. In the illustrated embodiment, the seatback portion 32 is pivotally supported to the floor 22 by pivot pins 33. It will be apparent to those skilled in the art from this disclosure that the rear seat 26 can have other arrangements such that the seatback portion 32 moves between the upright position and the lowered position.

The seatback portion 32 also includes a latching mechanism 34 that releasably secures the seatback portion 32 to the rear window support portion 28 in a conventional manner, such that the seatback portion 32 can be pivoted between the upright (locked) position (shown in solid lines in FIG. 2) and the lowered position (shown in dashed lines in FIG. 2) for exposing the storage compartment structure 12 to the passenger compartment 14. Thus, when the latching mechanism 34 of the seatback portion 32 is disengaged, the seatback portion 32 is free to pivot from the upright position to the lowered position as shown in FIG. 2. When the seat is in the lowered position, the effective area of the rear trunk area of the vehicle 10 is increased. The latching mechanism 34 is a conventional mechanism for restraining movement of a pivoting seatback and detailed description of the latching mechanism is therefore omitted.

Figure 4:
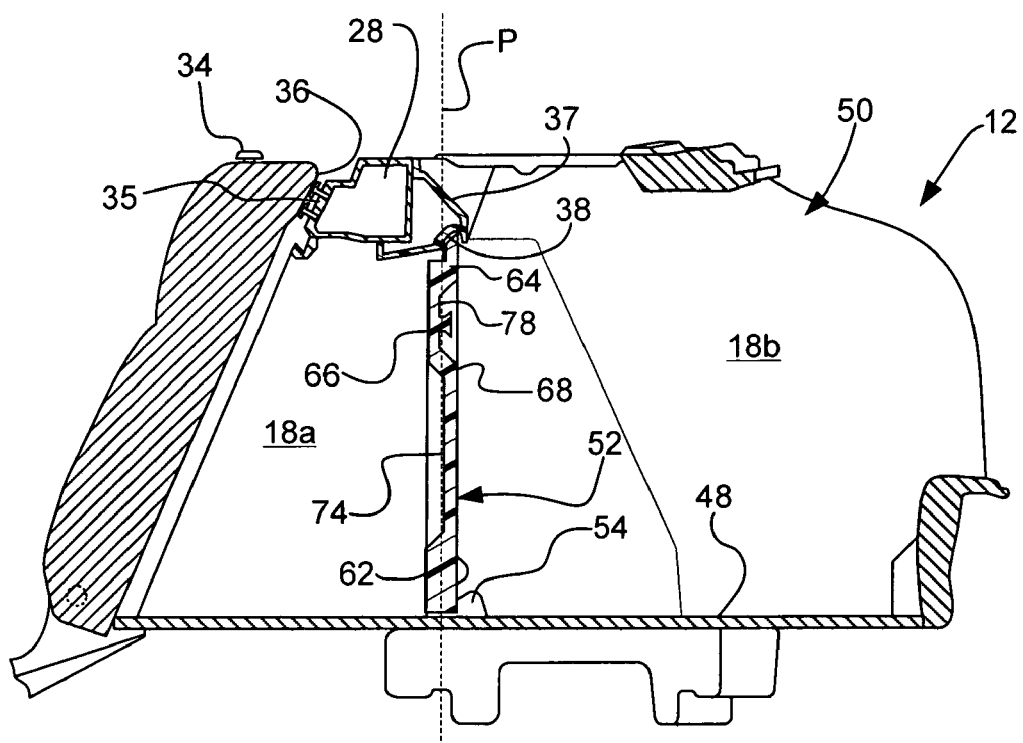
FIG. 4 is a simplified partial cross sectional view of the rear seat and storage compartment showing the compartment divider in an upright, vertical position, separating the storage compartment into two portions, in accordance with the present invention.
Figure 5:
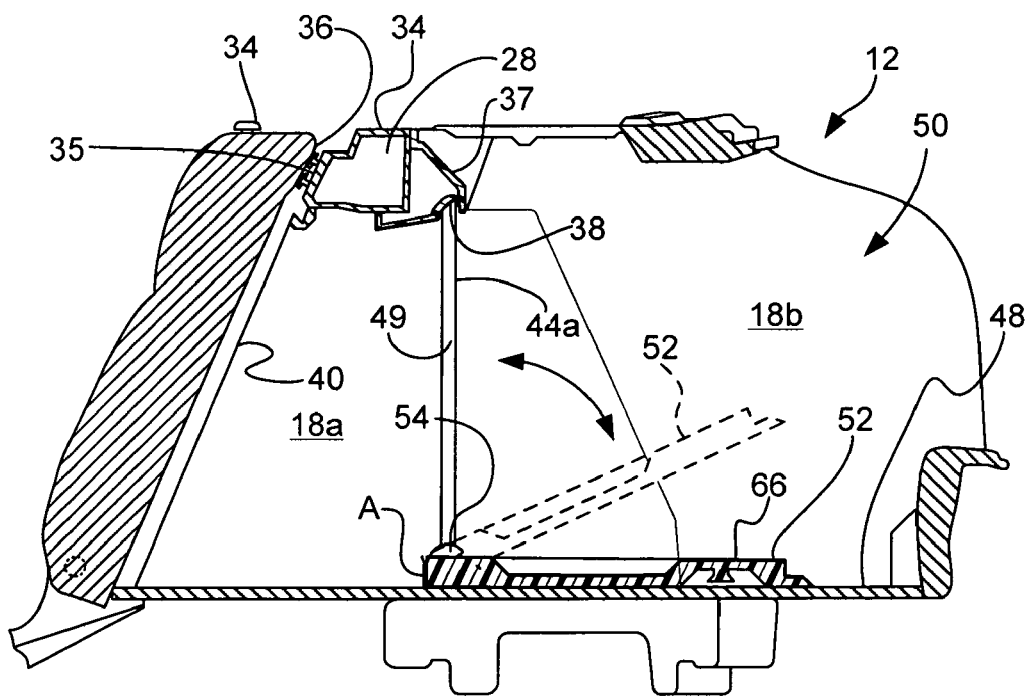
FIG. 5 is a simplified partial cross sectional view of the rear seat and storage compartment, similar to FIG. 4, showing with the compartment divider in a lowered, horizontal position, thereby leaving the storage compartment undivided, in accordance with the present invention.
Figure 11:
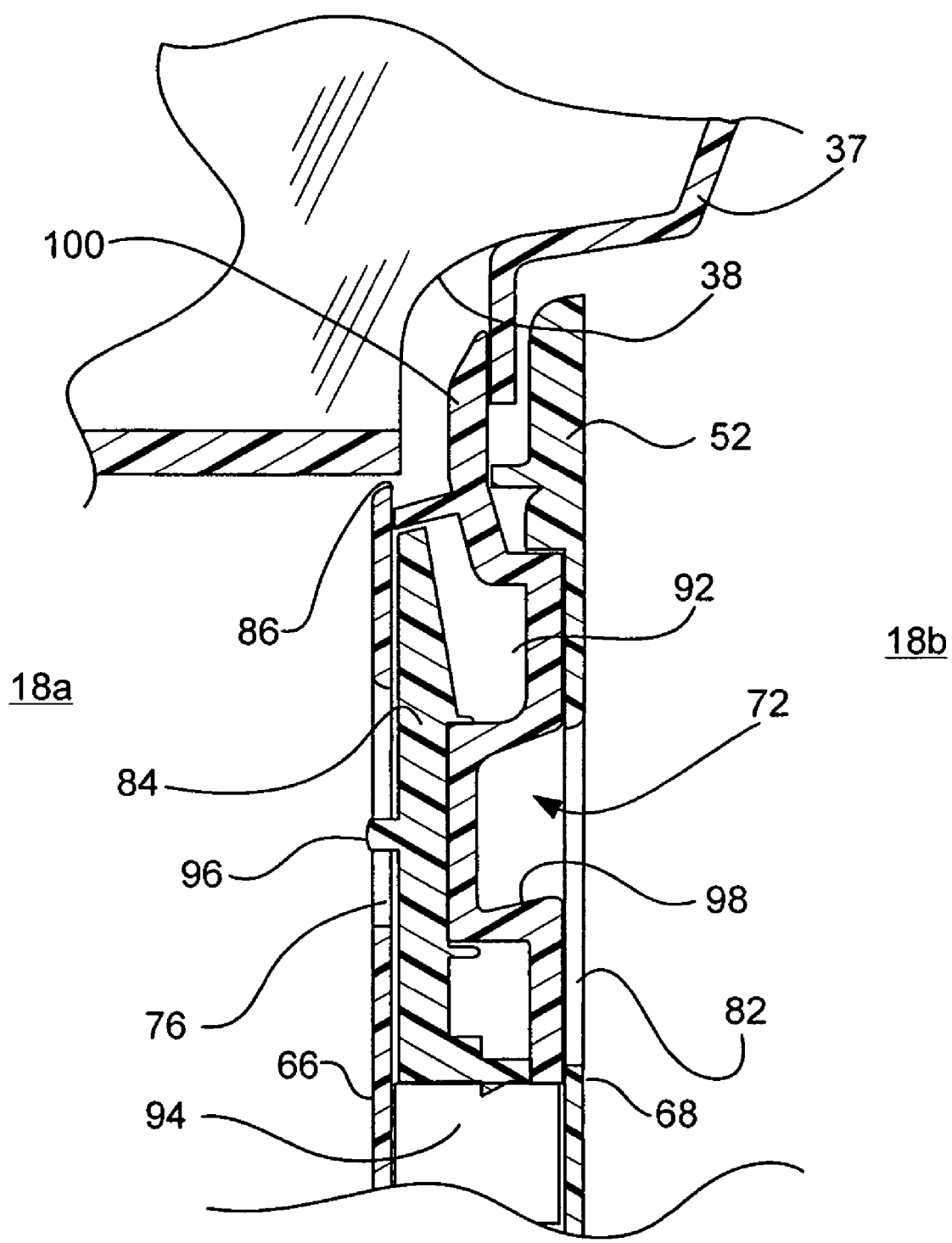
FIG. 11 is an enlarged, simplified partial cross-sectional view of the upper portion of the compartment divider and the storage compartment structure, showing a latching mechanism in a latched position, in accordance with the present invention.

As shown more clearly in FIGS. 4, 5 and 11, the rear window support portion 28 includes a seatback support surface 35 (FIGS. 4 and 5). The seatback support surface 35 supports an upper end 36 of the seatback portion 32 of the rear seat 26 when the seatback portion 32 is in its upright position. The rear window support portion 28 also includes latch portions (not shown) which restrain the seatback portion 32 against movement when the latching mechanism 34 is engaged. The rear window support portion 28 further serves as a shelf within the passenger compartment 14. A stationary member 37 is fixedly attached to the rear window support portion 28. The stationary member 37 includes a latch recess 38 (FIGS. 4, 5 and 11). As is indicated in FIGS. 4 and 5, the rear window support portion 28 is a structural member made of metal. The stationary member 37 is made of a plastic material.

With reference now to FIGS. 2, 3 and 5, the storage compartment structure 12 of the vehicle 10 is now described in greater detail. The storage compartment structure 12 is rigidly supported or formed within the vehicle 10 using conventional securing methods, such as welding techniques. In other words, the vehicle 10 includes several metallic panels and/or shaped members that are fixed together to form a rigid frame to support the storage compartment structure 12 in the vehicle 10, as shown in FIG. 3. The storage compartment structure 12 of the vehicle 10 basically includes a back panel or surface 40 of the seatback portion 32, a trunk lid 42, a pair of lateral side walls 44 and 46 and a floor 48. Thus, the storage compartment structure 12 of the vehicle 10 forms a closed box or storage compartment 50. The storage compartment 50 is separated and distinct from the passenger compartment 14 when the seatback portion 32 is in the upright (locked) position.

Figure 6:
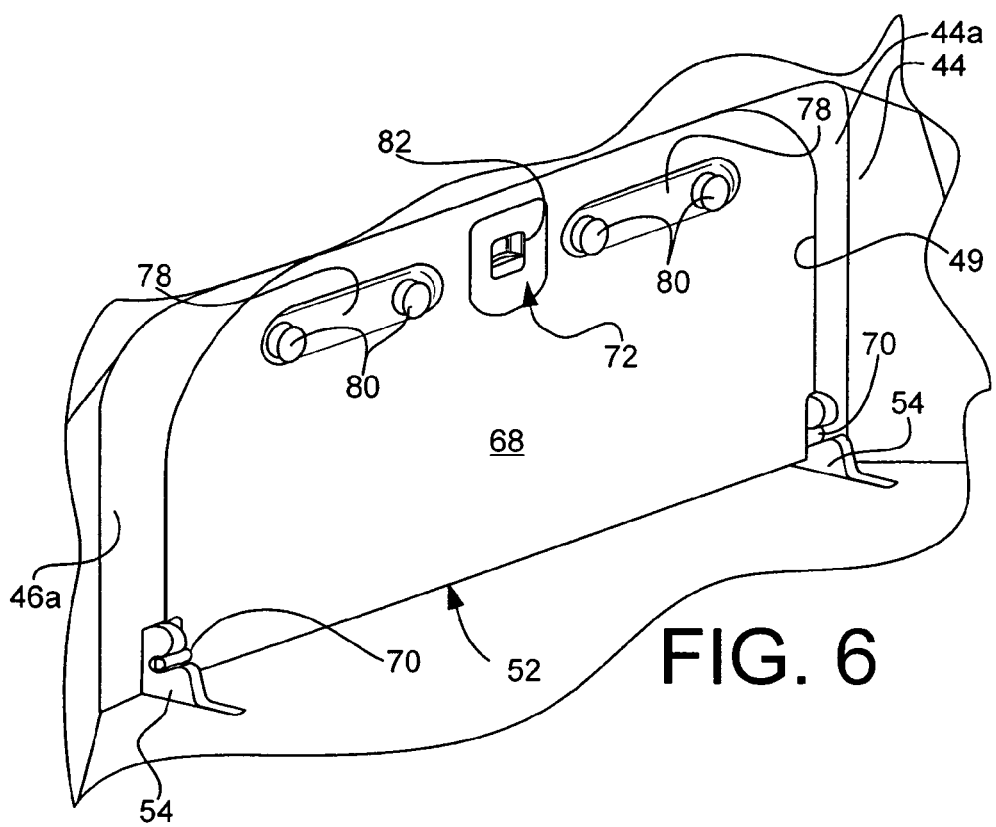
FIG. 6 is a simplified partial perspective view of a portion of the storage compartment showing the compartment divider in the upright, vertical position also shown in FIG. 4, in accordance with the present invention.
Figure 7:
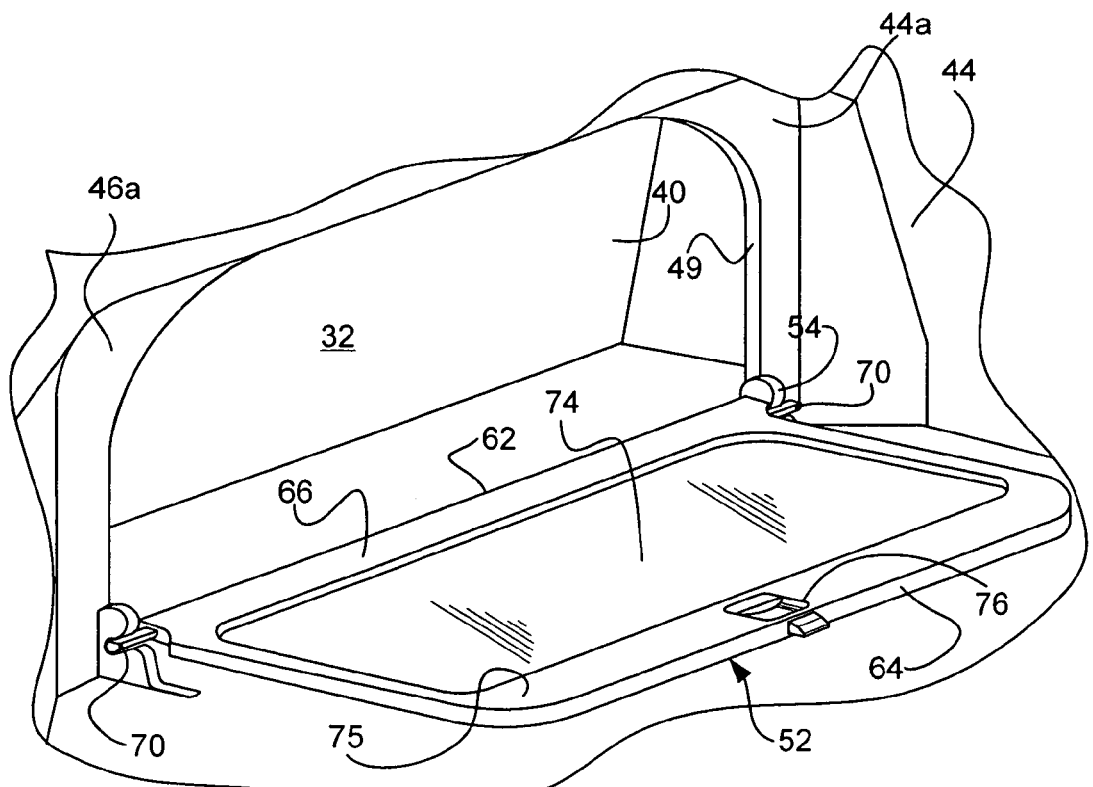
FIG. 7 is a simplified partial perspective view of a portion of the storage compartment showing the compartment divider in the lowered, horizontal position also shown in FIG. 5, in accordance with the present invention.

As seen in FIGS. 6 and 7, the side walls 44 and 46 of the storage compartment structure 12 have a pair of wall projecting portions or structures 44a and 46a, respectively. The wall projecting portions or structures 44a and 46a extend inwardly from the side walls 44 and 46 to define side portions of an opening 49. The opening 49 is further defined by the stationary member 37 and the floor 48. Preferably, the peripheral edge of the opening 49 is substantially rectangular with rounded upper corners.

The storage compartment structure 12 further includes partitioning structure that includes a rigid compartment divider 52 and a pair of support blocks 54. The compartment divider 52 is pivotally supported on the floor 48 by the support blocks 54 to selectively divide or partition the storage compartment 50 into two separately concealed spaces. In particular, the compartment divider 52 has a peripheral edge that closely matches the peripheral edge of the opening 49. The compartment divider 52 pivots within the opening 49 between a first substantially horizontal storage position and a second substantially vertical dividing position.

In the first substantially horizontal storage position, the compartment divider 52 lies substantially flat on the floor 48 such that the storage area is substantially unobstructed by the compartment divider 52 as seen in FIG. 5. As shown in FIG. 5, in the first substantially horizontal storage position, an edge or end of the compartment divider 52 defines an abutment A. The abutment A extends upwardly relative to the floor 48. In the second substantially vertical dividing position, the rigid compartment divider 52 partitions the storage compartment 50 into two separately concealed spaces as seen in FIGS. 2 to 4. When the compartment divider 52 is in the substantially vertical dividing position, one of the separately concealed spaces is accessible by folding down the seatback portion 32, while the other separately concealed space is accessible by opening the trunk lid 42. The compartment divider 52 is described in greater detail below.

The trunk lid 42 is pivotally coupled to portions of the storage compartment structure 12 in a conventional manner. Thus, the trunk lid 42 can be lowered to seal the trunk opening of the storage compartment structure 12 as shown in FIG. 1, and lifted to an open position to access the storage compartment structure 12, as shown in FIG. 2. It should be appreciated that in FIG. 3, the trunk lid 42 and rear fenders of the vehicle 10 have been removed to reveal the storage compartment structure 12. The rear fenders of the vehicle 10 at least partially enclose or cover the storage compartment structure 12.

The side walls 44 and 46 and the floor 48 of the storage compartment structure 42 are unitarily formed of formed steel plates welded together. The side walls 44 and 46, and floor 48 are typically covered with a carpeting material or the like to protect the metal surfaces to provide a softer surface for storage of cargo and to provide a more aesthetically pleasing appearance within the storage compartment 50.

The two support blocks 54 are rigidly fixed to opposite lateral sides of the floor 48 of the storage compartment 50 adjacent to the side walls 44 and 46. The compartment divider 52 is pivotally supported by the two support blocks 54 for movement between an upright closed position, shown in FIGS. 4 and 6, and a lowered position shown in FIGS. 5 and 7, as described in greater detail below.

It should be understood from this disclosure that the support blocks 54 can be bolted, welded or otherwise fixed to the floor 48. Alternatively, the support blocks 54 can be molded into or fixed to the side walls 44 and 46. Further, the support blocks 54 can be fixed within recesses (not shown)

formed in the floor 48 and at least partially covered by carpeting to obscure them from view.

The two support blocks 54 are generally identical, and therefore only one support block 54 is described, since the description of one fully applies to the other. The support blocks 54 are preferably formed of a 40% glass filled polypropylene (GAPEX) in order to sustain and carry the loads or forces that are expected to act upon the compartment divider 52 and the support blocks 54 during normal conditions. Each of the blocks includes cargo net hooks 55, as shown in FIGS. 8, 9 and 10.

Figure 8:
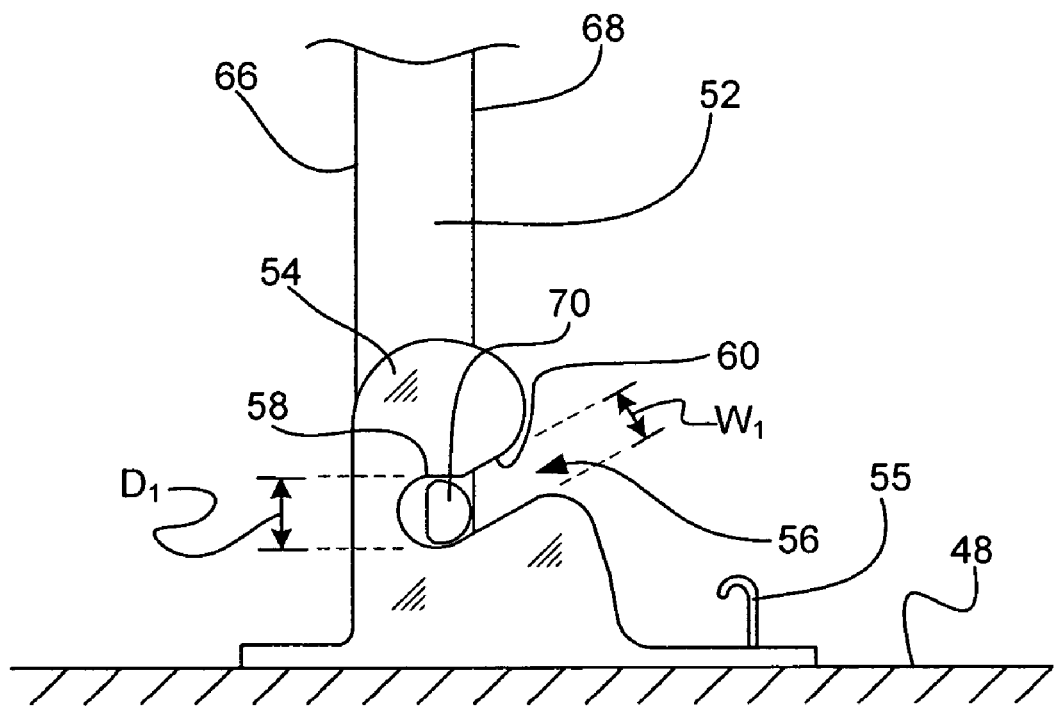
FIG. 8 is an enlarged, simplified partial side elevational view of the floor of the storage compartment showing one of two support blocks that support the compartment divider, with the compartment divider in the upright, vertical position, in accordance with the present invention.
Figure 9:
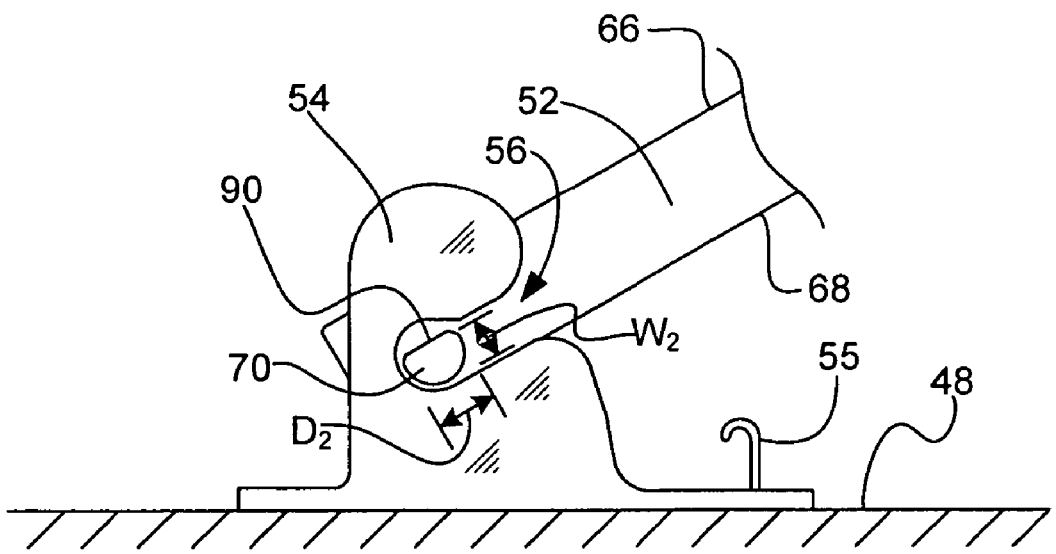
FIG. 9 is an enlarged, simplified partial side elevational view of the floor of the storage compartment, similar to FIG. 8, showing one of two support blocks that support the compartment divider, with the compartment divider in an angled position for removal and/or installation of the compartment divider within the storage compartment, in accordance with the present invention.
Figure 10:
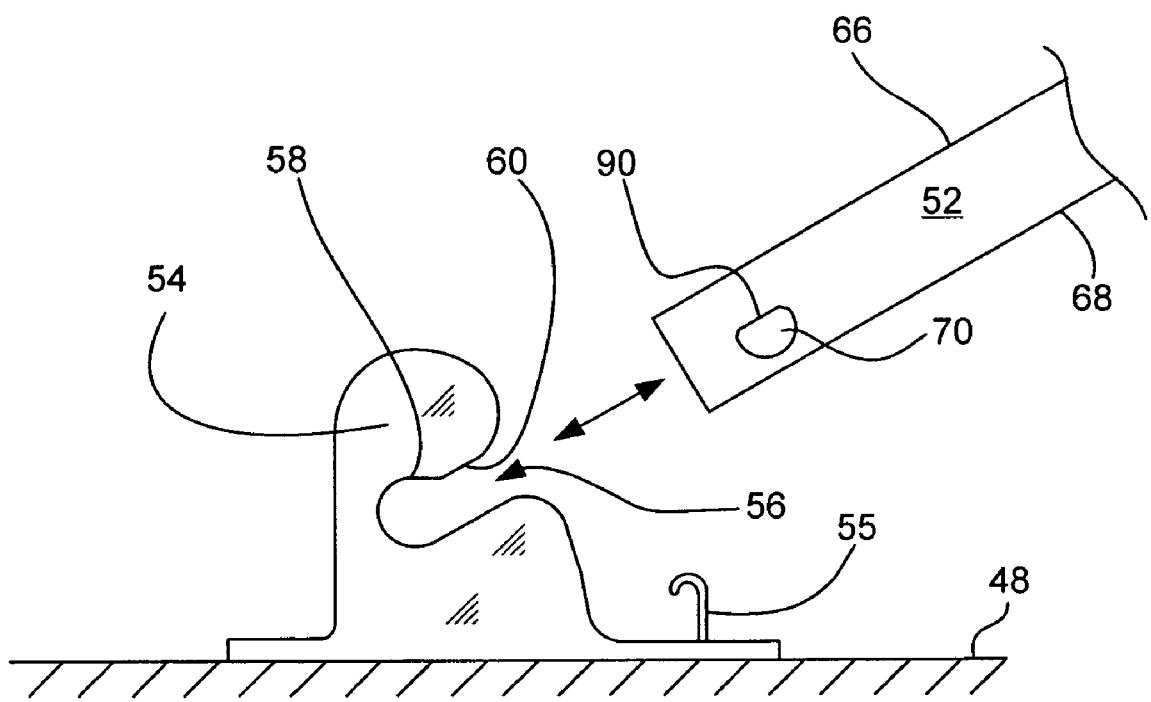
FIG. 10 is an enlarged, simplified partial side elevational view of the floor of the storage compartment, similar to FIGS. 8 and 9, showing one of two support blocks that support the compartment divider, with the compartment divider removed from the support block and freely removable from the storage compartment, in accordance with the present invention.

Referring now to FIGS. 6-10, but more specifically to FIGS. 8, 9 and 10, each of the support blocks 54 is formed with an elongated mounting slot 56 that opens at an angle relative to the floor 48. The mounting slots 56 of the support blocks 54 pivotally support the compartment divider 52 to the floor 48. Thus, the support blocks 54 form a part of a mounting structure that is configured and arranged such the compartment divider 52 is removable from the vehicle storage compartment 50 when in an intermediate position between the horizontal storage position and the second substantially vertical dividing position.

Basically, each of the mounting slots 56 has a shape that includes a circular portion 58 and a slot portion 60. The circular portion 58 of the mounting slot 56 has a maximum width or diameter $D_1$, while the slot portion 60 has a maximum width or width $W_1$. The slot portion 60 is defined by two parallel opposing surfaces that are spaced apart from one another by the width $W_1$ that is smaller than the diameter $D_1$, as is shown in FIGS. 8, 9 and 10. The shape and configuration of the mounting slot 56 restrains the compartment divider 52 for pivotal movement between the upright closed position (FIG. 6) and the lowered position (FIG. 7) but also allows for easy removal of the compartment divider 52 from the storage compartment structure 12 without the use of tools in a manner as described more fully below.

As best seen in FIGS. 4, 5, 6 and 7, the compartment divider 52 includes a hinged end 62, a latching end 64, a first side 66 and a second side 68. When the compartment divider 52 is in the vertical dividing position, the hinged end 62 is pivotally coupled to the floor 48 and the latching end 64 is releasably coupled to the rear window support portion 28. Also, when the compartment divider 52 is in the vertical dividing position, the first side 66 faces towards the back panel 40 of the seatback portion 32, while the second side 68 faces towards the trunk lid 42. Preferably, the compartment divider 52 is formed with sandwiched type composite materials such that the first side 66 has a water resistant side panel surface and the second side 68 has a non-woven material surface. Thus, when the compartment divider 52 is in the substantially horizontal storage position the water resistant side panel surface of the first side 66 of the compartment divider 52 faces upwardly so that the carpet on the floor 48 is protected. Preferably, the non-woven material surface of the second side 68 of the compartment divider 52 matches a non-woven material that overlies the floor 48 and the side walls 44 and 46. Thus, when the compartment divider 52 is in the vertical dividing position, the non-woven material surface of the second side 68 of the compartment divider 52 faces towards the trunk lid 42 to provide an aesthetically pleasing appearance. For example, the compartment divider 52 can be constructed of a rigid sheet molded compound (SMC) material, other molded materials, plastic, fiberglass and/or other composite materials, having a high tensile strength with the second side 68 of the compartment divider 52 being covered with a non-woven material such as carpet covered with a polypropylene (Flax) that is glued to the molded compound material. As mentioned above, the non-woven material is preferably similar to non-woven materials covering the side walls 44 and 46 and the floor 48.

The compartment divider 52 extends approximately the width of the storage compartment structure 12. Preferably, the compartment divider 52 contacts the wall projecting portions 44a and 46a of the side walls 44 and 46, respectively, as shown in FIGS. 6 and 7 to form a continuous wall when the compartment divider 52 is in the upright, closed position shown in FIGS. 3, 4 and 6. More specifically, the opening 49 and the compartment divider 52 have complimentary shapes such that with the compartment divider 52 in the vertical upright position shown in FIG. 6, the opening 49 is completely obscured and covered. It should be understood from this disclosure that the floor 48 is free of any upward projection in the area between the wall projecting portions 44a and 46a and more specifically in the area of the opening 49.

Moreover, it should be understood from this disclosure that the compartment divider 52 can be formed in any of a variety of shapes that preferably matches an interior of the storage compartment structure 12 to divide the compartment space 18 into two distinct and separate concealed spaces. For example, the compartment divider 52 and the opening 49 can be formed with matching shapes that follow the interior contour of the storage compartment structure 12.

As is shown in FIGS. 4, 5, 6 and 7 and mentioned above, the compartment divider 52 is moveable between a generally vertical upright dividing position (FIGS. 4 and 6) and a reclined or lowered storage position (FIGS. 5 and 7). With the compartment divider 52 in the upright vertical position, the wall projecting portions 44a and 46a along with the compartment divider 52 form a continuous partition that divides the compartment space 18 into two distinct and separate concealed spaces. More particularly, the storage compartment structure 12 is divided into a concealed cargo space 18a, and a traditional cargo space 18b, as shown in FIG. 4. With the compartment divider 52 in the lowered position, the storage compartment structure 52 is undivided, maximizing available cargo space, as shown in FIGS. 5 and 7.

As shown more clearly in FIGS. 6-10, the hinged end 62 of the compartment divider 52 includes a pair of support portions or pins 70 that project in opposite lateral directions. The hinged end 62 of the compartment divider 52 has a generally straight edge extending between the pivot pins 70 corresponding to the contour of the floor 48. Preferably the support pins 70 are located at lower opposite ends of the hinged end 62 of the compartment divider 52. The pivot pins 70 are identical and therefore description of one applies to the other. Thus, the pivot pins 70 form a part of a mounting structure that is configured and arranged such the compartment divider 52 is removable from the vehicle storage compartment 50 when in an intermediate position between the horizontal storage position and the second substantially vertical dividing position.

Each pivot pin 70 is dimensioned with a maximum width or diameter $D_2$ that is slightly smaller than the maximum diameter $D_1$ of the circular portion 58 of the mounting slot 56 in the support blocks 54. It should be understood from this disclosure that the diameter $D_2$ need only be slightly smaller than the diameter $D_1$ to allow the compartment divider 52 to pivot on the pivot pins 70 within the mounting slot 56 of the support blocks 54 from the upright position to the lowered position of the compartment divider 52, as shown in FIGS. 4, 5, 8 and 9.

With reference to FIGS. 8, 9 and 10, the pivot pins 70 are also formed with a flat portion 90 where the diameter $D_2$ is interrupted, the thickness of the pivot pins 70 at the flat portion 90 being dimensioned to a width $W_2$. The width $W_2$ is slightly smaller than the width $W_1$ of the slot portions 60 of the mounting slots 56 of the support blocks 54. As should be understood from the drawings and the description provided herein, the compartment divider 52 can be partially lowered to the orientation shown in dashed lines in FIG. 5 and also shown in FIGS. 9 and 10 such that the flat portion 90 of the pivot pins 70 is parallel to the surfaces of the slot portions 60 making it possible to remove the pivot pins 70 from the mounting slots 56 of the support blocks 54. Thus, the compartment divider 52 can be easily remove from the storage compartment structure 12 without any tools as shown in FIG. 10. From the above described structure and the drawings, it should be understood that the pivot pins 70 are mating members that work in concert with the mounting slots 56 for pivotally supporting in the compartment divider 52, while still allowing the compartment divider 52 to be easily removed when rotated to the intermediate position, as shown in FIGS. 5, 9 and 10.

As should be understood from this disclosure, the compartment divider 52 is retained for pivotal movement between an upright closed position (FIGS. 4 and 6) and a lowered position (FIGS. 5 and 7) by the narrow dimensions of the slot portions 60 since the diameters $D_2$ of the pivot pins 70 are larger than the widths $W_1$ of the slot portions 60. However, by pivoting the compartment divider 52 to a slightly angled position or orientation (FIG. 9) the compartment divider 52 can be removed from the storage compartment structure 12 (FIG. 10) since the flat portions 90 of the pivot pins 70 allows the pivot pins 70 to slide through the narrow widths $W_1$ of the slot portions 60 of the mounting slots 56. However, in any orientation other than that shown in FIGS. 5 and 9, the pivot pins 70 are retained within the circular portions 58 of the mounting slots 56 because the width $W_1$ of the slot portions 60 of the mounting slots 56 are smaller that the diameter $D_2$ of the pivot pins 70.

Figure 12:
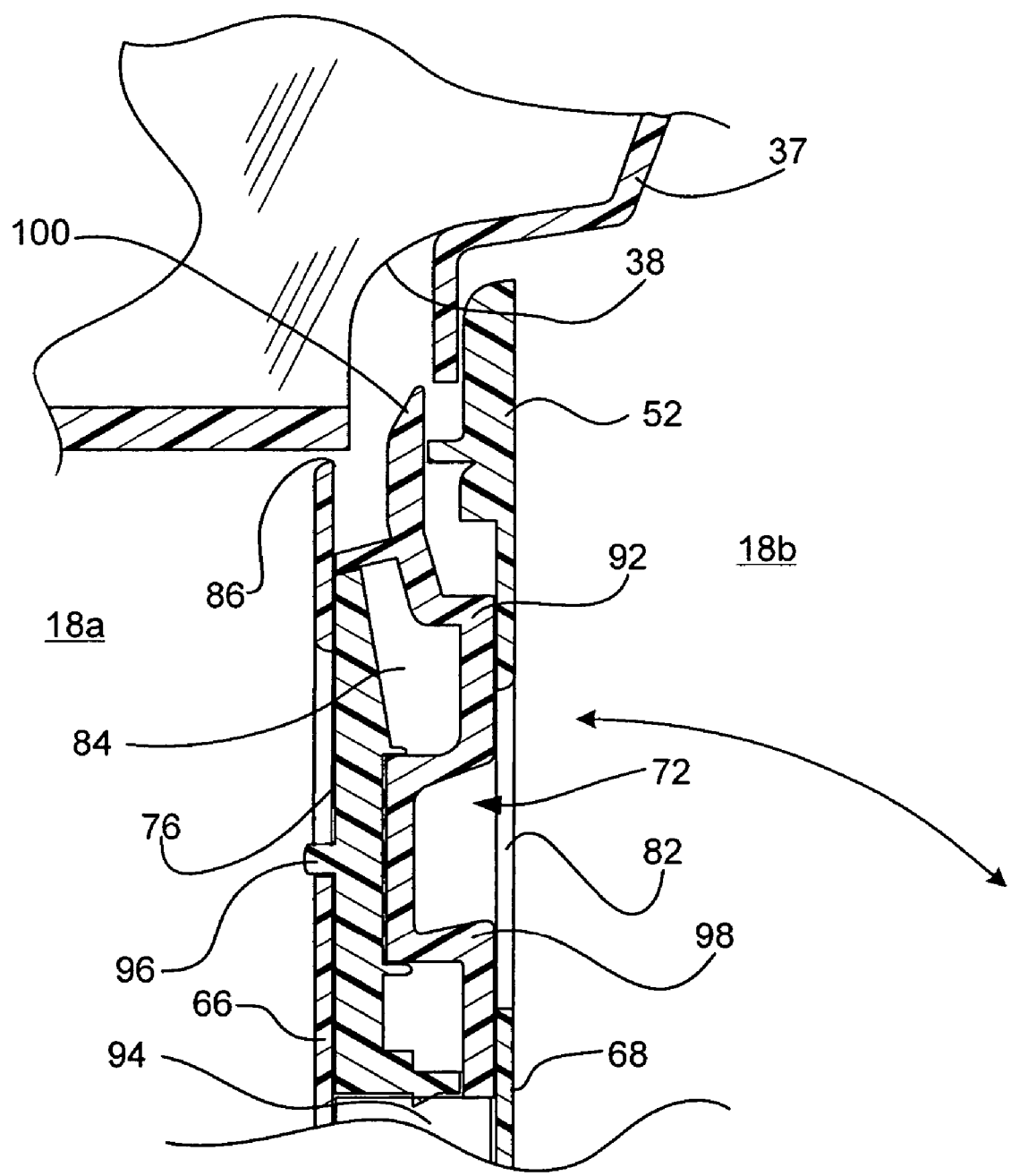
FIG. 12 is an enlarged, simplified partial cross-sectional view of the upper portion of the compartment divider and the storage compartment structure, showing a latching mechanism in an unlatched position thereby allowing the compartment divider to move from an upright closed position to a lowered position, as indicated by the arrow, in accordance with the present invention.

As best seen in FIGS. 5 and 6, the latching end 64 of the compartment divider 52 has a straight mid-portion and a pair of curved corners that correspond to the shape of the opening 49. A latch mechanism 72 is provided in a central area of the latching end 64 of the compartment divider 52. It should also be understood from the drawings and the description that the latch mechanism 72 of the compartment divider 52 can be fitted with a lock (not shown) to further secure the compartment divider 52 in the vertical dividing position. As best seen in FIGS. 11 and 12, the latching end 64 of the compartment divider 52 is further formed with a recess 84 having a striker opening 86 along the edge of the latching end 64. The recess 84 extending between a portion of the first side 66 and a portion of the second side 68, as shown more clearly in FIG. 11. The latch mechanism 72 is disposed within the recess 84 as discussed below.

As best seen in FIG. 7, the first side 66 of the compartment divider 52 is formed with a large recess 74 defined by an outer ridge 75. In other words, the recess 74 is completely surrounded by the outer ridge 75 and offset from the outer ridge 75 to define a depression or tray in the first side 66. As mentioned above, the first side 66 of the compartment divider 52 is preferably made of formed plastic or other similar rigid moldable material that allows the recess 74 to retain water when the compartment divider 52 is in a reclined or lowered position, as shown in FIGS. 5 and 7. Preferably, the depth and size of the recess 74 is sufficient to hold approximately sixty-seven (67) ounces of liquid. In the preferred embodiment, the recess 74 is dimensioned to cover substantially the entire first side 66 of the compartment divider 52. The bottom of the recess 74 is a flat surface 74. While the recess 74 has a generally rectangular shape with rounded corners, it should be understood from this disclosure that other suitable shapes are possible. The recess 74 provides a space for putting wet materials, such as swimming suits, wet suits or liquid filled containers in the storage compartment structure 12 segregated from other materials that should preferably remain dry.

An opening 76 is also formed on the outer ridge 75 proximate the latching end 64 for operating the latch mechanism 72 as described in greater detail below. The opening 76 is preferably centrally located along the latching end 64 such that the latch mechanism 72 can securely retained the compartment divider 52 in the vertical dividing position.

Figure 13:
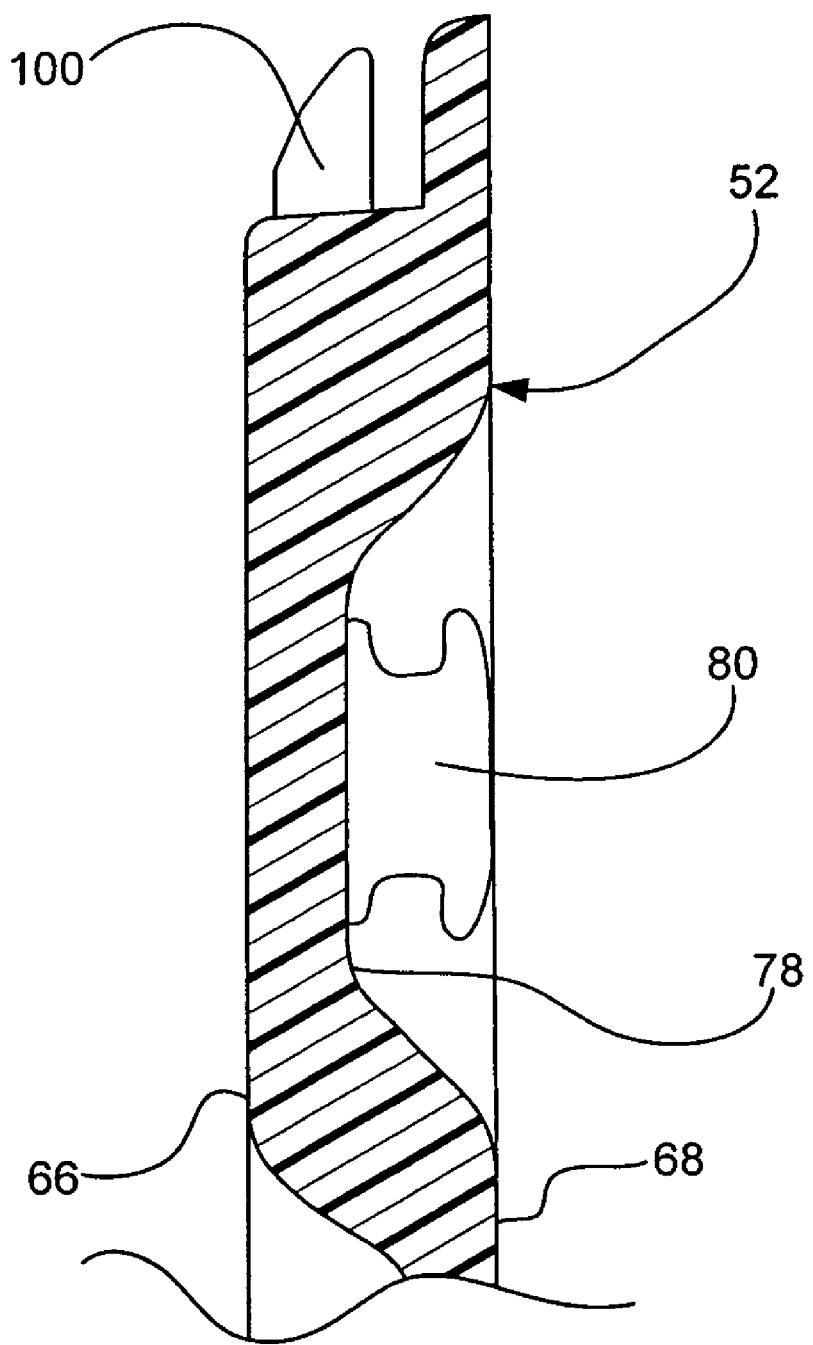
FIG. 13 is an enlarged, simplified partial cross-sectional view of the upper portion of the compartment divider, showing one of a plurality of hooks used with the compartment divider in accordance with the present invention.

The second side 68 of the compartment divider 52, as shown in FIG. 6 and 13, is generally flat and smooth and covered with carpet, and is formed with two recesses 78, each recess 78 installed with two hooks 80 for retention of cargo such as grocery bags, and is further formed with an opening 82 for accessing the latch mechanism 72. As indicated in FIG. 4. the recess 74 formed on the first side 66 of the compartment divider 52 and the recesses 78 on the second side 68 of the compartment divider 52 lie in a plane P. Further, as shown in FIG. 6, the plane P is parallel to the first and second sides 66 and 68, and bisects the compartment divider 52.

As shown more clearly in FIGS. 11 and 12, the latch mechanism 72 includes a retractable member 92 and a biasing member 94 that are disposed in the recess 84. The biasing member 94 can be a spring or an elastic material that urges the retractable member 92 upward. The retractable member 92 includes a pair of handles 96 and 98 and a tongue 100. The handle 98 is the primary or first handle of the compartment divider 52, while the handle 96 is a secondary or second handle of the compartment divider 52. Preferably, the retractable member 92 is unitarily formed as a one-piece, unitary member from a hard rigid material such as metal or hard plastic. The handle 96 is accessible through the opening 76 in the first side 66 of the compartment divider 52. The handle 98 is accessible through the opening 82 in the second side 68 of the compartment divider 52. The tongue 100 of the retractable member 92 is further unitarily formed with a tongue 100 that is extensible through the striker opening 86. The tongue 100 defines a latching protrusion that extends out of the striker opening 86 at the upper end of the compartment divider 52, the latching protrusion engaging the latch recess 38 formed in the stationary member 37.

As should be understood from the drawings and the description herein, there are many distinct advantages to the present invention. The compartment divider 52 partitions the storage compartment structure 12 into two distinct spaces 18a and 18b that can used to segregate cargo space into two distinct portions for storing, for instance: clean cargo and dirty cargo; wet cargo and dry cargo; and, long term storage cargo and short term storage cargo. The compartment divider 52 also creates a large secure storage space 18a which is relatively hidden. Larger valuable items that cannot fit in, for example, a glove compartment of a vehicle, can be stored in the space 18a. Valuables may be temporarily stored in the space 18a with relative safety since most auto theft occurs spontaneously with an intruder rapidly looking through cargo in easily accessed areas of the vehicle.

In the depicted and described embodiments of the invention, the compartment divider 52 can be lowered from inside the passenger compartment 14 or from the storage compartment structure 12. For instance, with the seatback portion 32 lowered, the storage space 18a of the storage compartment structure 12 is exposed. Passengers of the vehicle can reach into the space 18a and operate the latching mechanism 72 by pressing down on the handle 96 thereby releasing the tongue 100 from the latch recess 38 (see FIGS. 11 and 12). The compartment divider can then be pushed toward its lowered position, as shown in FIGS. 5 and 7. From within the storage compartment structure 12, the driver or passenger can reach into the space 18b and press the handle 98 and pull on the compartment divider 52 and allow it to fall into its lowered position as shown in FIGS. 5 and 7.

The compartment divider 52 is also useful outside of the vehicle 10. For instance, the compartment divider 52 can be taken out of the storage compartment structure 12, laid on the ground with the first side 66 down, and carpet fixed to the second side 68 can provide a comfortable surface upon which to sit or kneel to change a tire.

With the compartment divider 52 installed in the storage compartment structure 12 in the upright position (FIGS. 2, 3 and 4) the hooks 80 can be used to secure grocery bags or other items as needed and/or desired.

Another feature of the present invention is the flexibility afforded by the folding seatback portion 32. By pivoting the seatback portion 32 to the lowered position shown in dashed lines in FIG. 2, the concealed storage space 18a is exposed for accessing cargo without opening the trunk lid 42. Further, with the seatback portion 32 folded and the compartment divider 52 in the lowered position the cargo space of the storage compartment structure 12 can be combined with part of the space of the passenger compartment 14. Longer and larger cargo can be loaded into the storage compartment structure 12.

Second Embodiment

A second embodiment of the present invention includes a compartment divider 152 and a pair of support blocks 154 as shown in FIGS. 14-23. The compartment divider 152 and the support blocks 154 are configured to be installed into the vehicle 10 discussed above. In particular, the compartment divider 152 and the support blocks 154 replace the compartment divider 52 and the support blocks 54 of the first embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The compartment divider 152 and the support blocks 154 generally provide similar benefits as the configuration of the first embodiment described above. For example, the compartment divider 152 can be raised to a vertical position dividing the compartment space into two separate areas. As with the first embodiment, the compartment divider 152 can also be lowered in order to provide a waterproof surface upon which to place wet articles. As well, the compartment divider 152 is removable from the storage compartment 50 of the first embodiment. Since the many of the features of the second embodiment are generally the same or similar to those in the first embodiment, only those features that differ from the first embodiment are described below.

Figure 14:
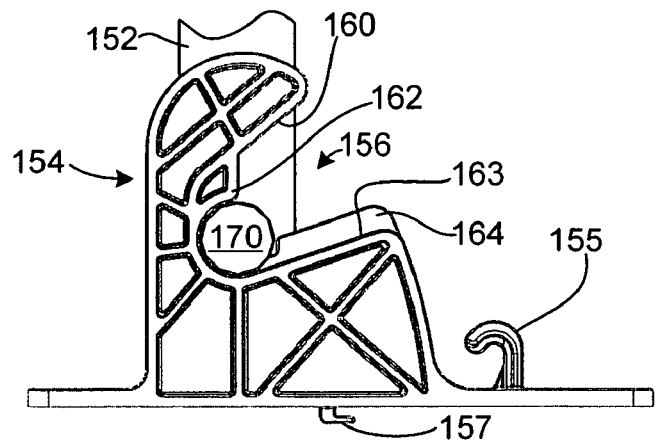
FIG. 14 is a side elevational view of a support block and a bottom portion of a compartment divider in accordance with a second embodiment of the present invention.
Figure 15:
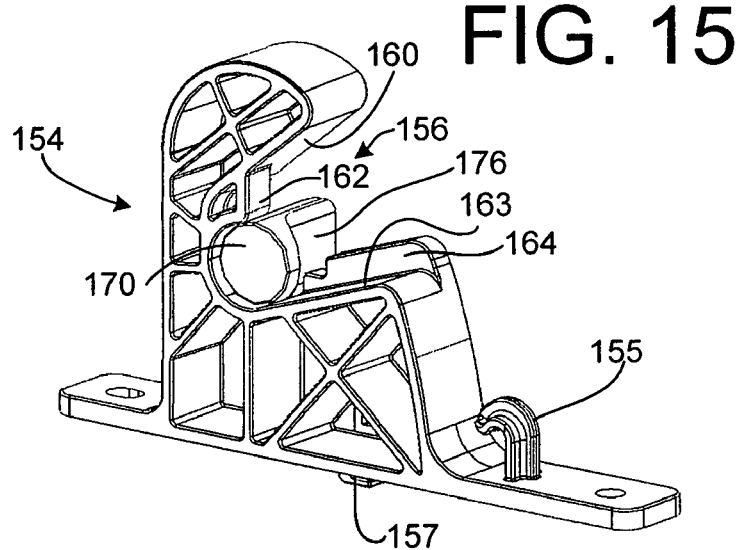
FIG. 15 is a perspective view of the support block and one of the pivot pins of the compartment divider in accordance with the second embodiment of the present invention.
Figure 16:
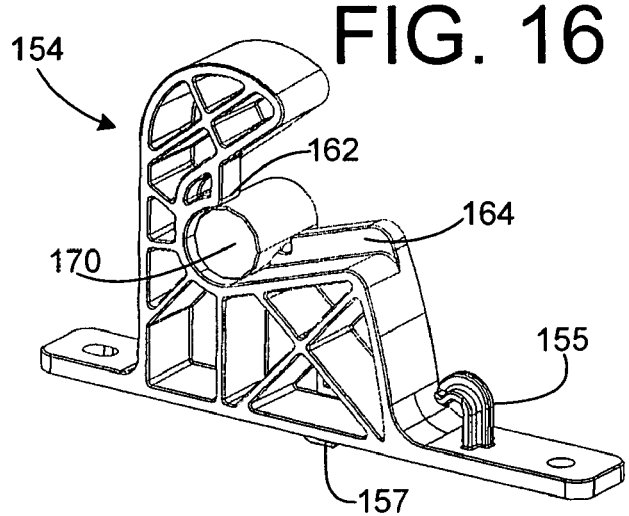
FIG. 16 is another perspective view of the support block and one of the pivot pins of the compartment divider in accordance with the second embodiment of the present invention.

A description of the support blocks 154 is provided first with specific reference to FIGS. 14, 15 and 16. The two support blocks 154 are generally identical, and therefore only one support block 154 is described. Each of the support blocks 154 is formed with a cargo hook 155, an elongated mounting slot 156 and an anti-rotational tab 157. The cargo hook 155 is non-movably fixed to the support block 154 for securing a cargo net within the storage compartment 50. The anti-rotational tab 157 is formed on a bottom surface of the support block 154. The anti-rotational tabs 157 engage a corresponding aperture (not shown) in the vehicle floor 48.

Figure 17:
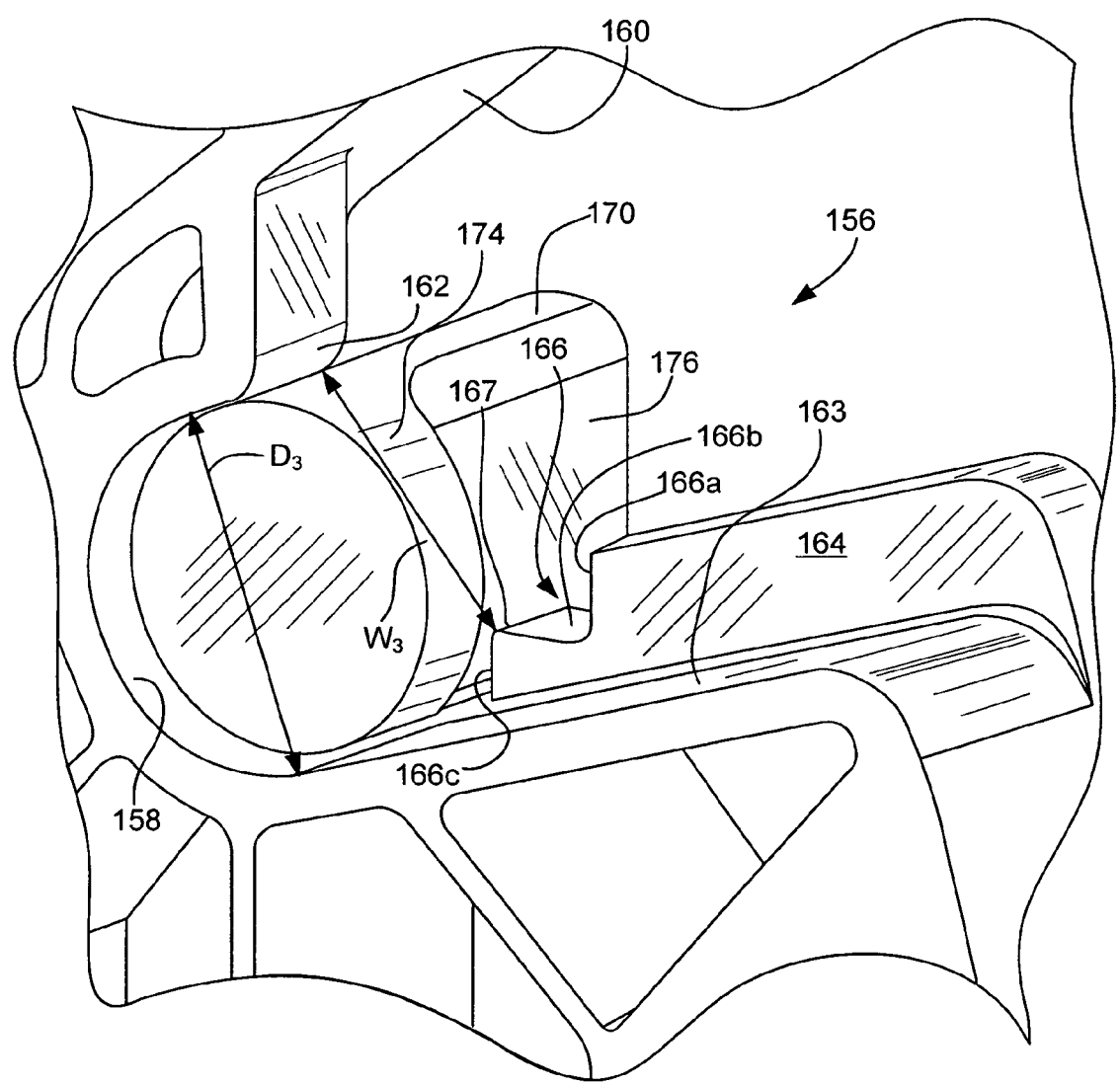
FIG. 17 is an enlarged, fragmentary perspective view of a first side of the support block and one of the pivot pins of the compartment divider, similar to FIGS. 15 and 16, in accordance with the second embodiment of the present invention.
Figure 18:
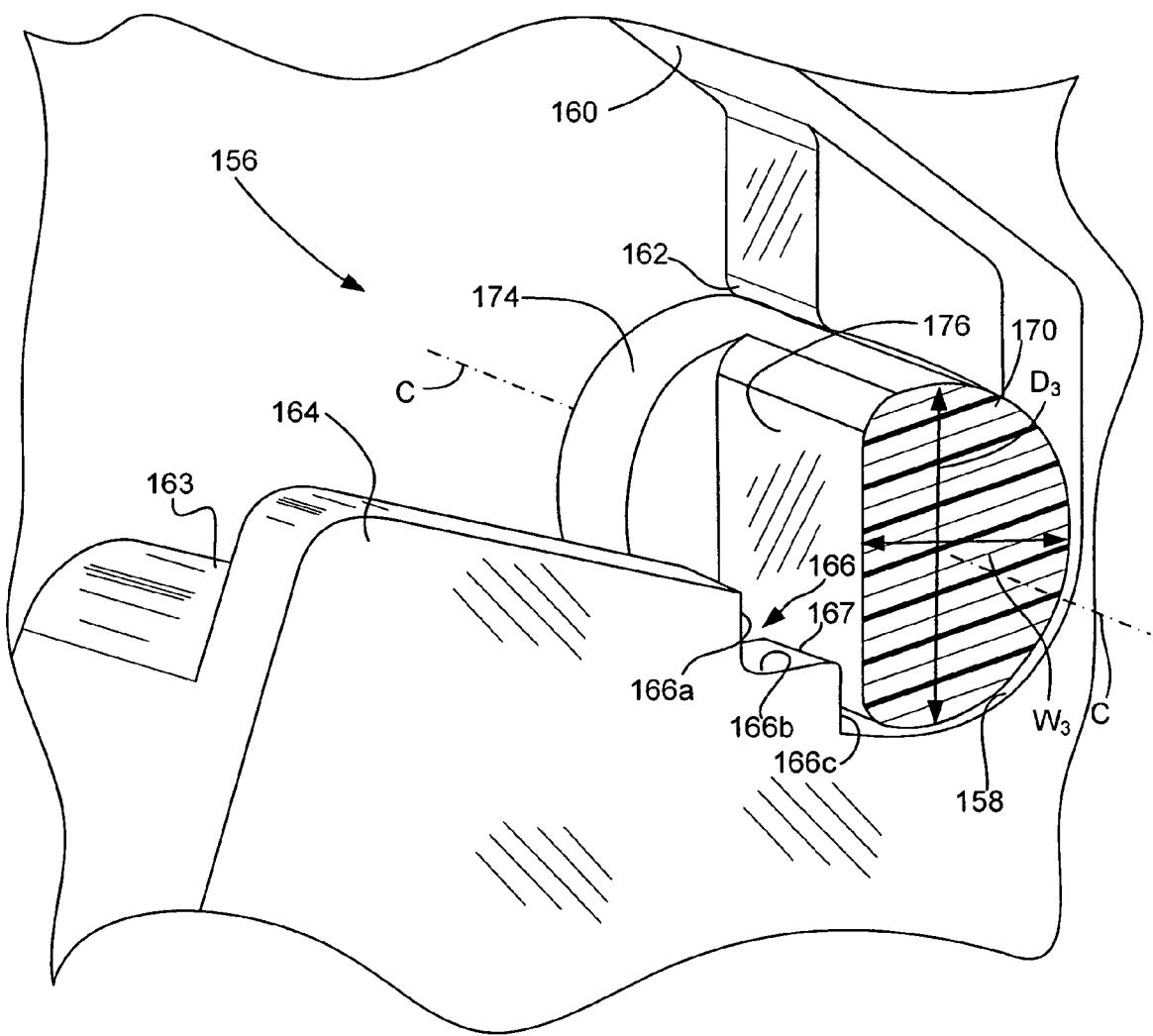
FIG. 18 is an enlarged, fragmentary perspective view similar to FIG. 17, showing a second side of the support block and one of the pivot pins of the compartment divider in accordance with the second embodiment of the present invention.

The elongated mounting slot 156 is now described in greater detail with specific reference to FIGS. 17 and 18. Basically, the elongated mounting slot 156 is formed with a curved pivot portion 158, an upper guide surface 160, an upper protrusion 162, a lower guide surface 163 and a lower protrusion 164. The curved pivot portion 158 of the mounting slot 156 is dimensioned with a maximum width or diameter $D_3$.

As with the first embodiment, the curved pivot portion 158 is shaped to receive a pivot pin 170 of the compartment divider 152, as shown in FIG. 17. In FIG. 17, the pivot pin 170 is shown separated from the compartment divider 152 to provide greater clarity. The curved pivot portion 158 provides a bearing surface upon which the pivot pin 170 pivots in order to movably support the compartment divider 152.

The upper guide surface 160 of the elongated mounting slot 156 preferably diverges relative to the lower guide surface 163, as is seen in FIG. 14. Referring again FIGS. 17 and 18, the upper protrusion 162 is located between the curved pivot portion 158 and the upper guide surface 160. A distal end of the upper protrusion 162 defines an upper part of a mouth or inlet opening of the curved pivot portion 158. As shown in FIGS. 14-18, the upper protrusion 162 is formed on an outboard side of the elongated mounting slot 156.

The lower guide surface 163 extends outwardly from the curved pivot portion 158 along the length of the elongated mounting slot 156. As shown in FIGS. 14-18, the lower protrusion 164 is only formed on an inboard side of the elongated mounting slot 156. As should be clear from the drawings and the description above, the upper protrusion 162 and the lower protrusion 164 are axially offset from one another with respect to the rotational axis C of the pivot pins 170 (see FIG. 18). The inner end of the lower protrusion 164 defines part of the mouth or inlet opening of the curved pivot portion 158.

The lower guide surface 163 and the upper guide surface 160 serve as guides during the installation of the compartment divider 152. Specifically, as the compartment divider 152 is installed in the storage compartment 50, the pivot pins 170 can selectively contact at least one of the upper and lower guide surfaces 160 and 163 so that the pivot pins 170 are guided into the curved pivot portion 158.

A portion of the lower protrusion 164 is provided with a recess 166. The recess 166 is basically a cutout portion of the lower protrusion 164. The recess 166 includes two approximately perpendicular surfaces 166a and 166b. The lower protrusion 164 also includes another surface 166c just below the recess 166. The lower protrusion 164 includes an inner edge 167 that is located between the surfaces 166b and 166c.

The inner edge 167 of the lower protrusion 164 and the distal end of the upper protrusion 162 define the mouth or inlet opening of the curved pivot portion 158 that has a minimum width or width $W_3$, for restricting movement of the pivot pins 170.

Figure 22:
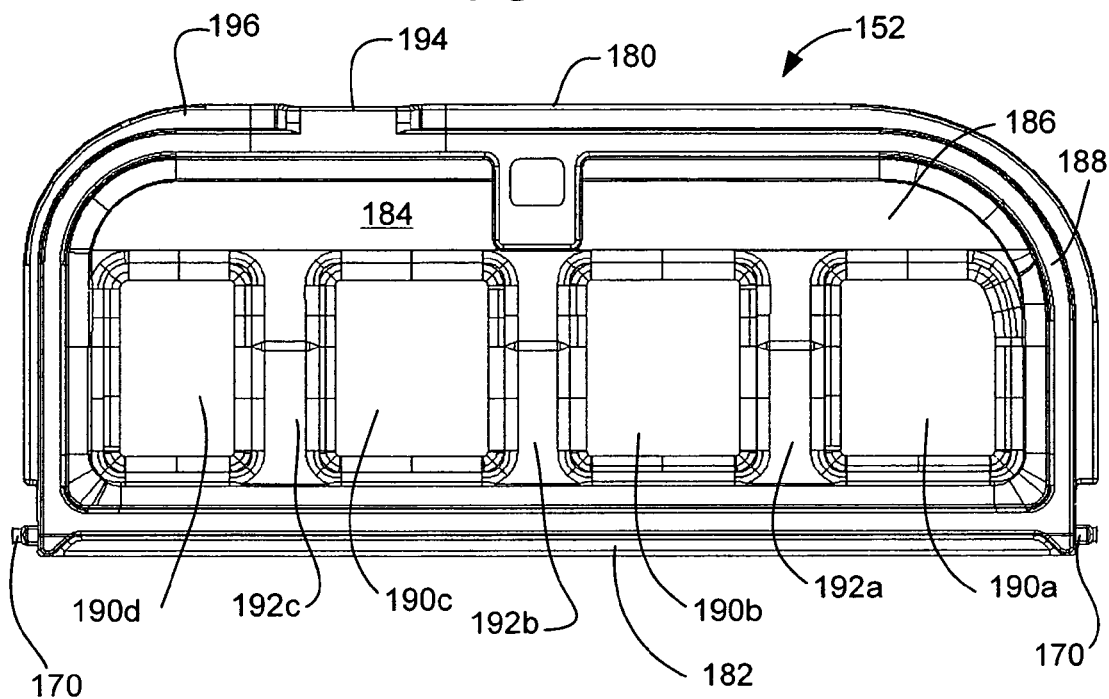
FIG. 22 is a top plan view of the compartment divider in accordance with the second embodiment of the present invention.
Figure 23:
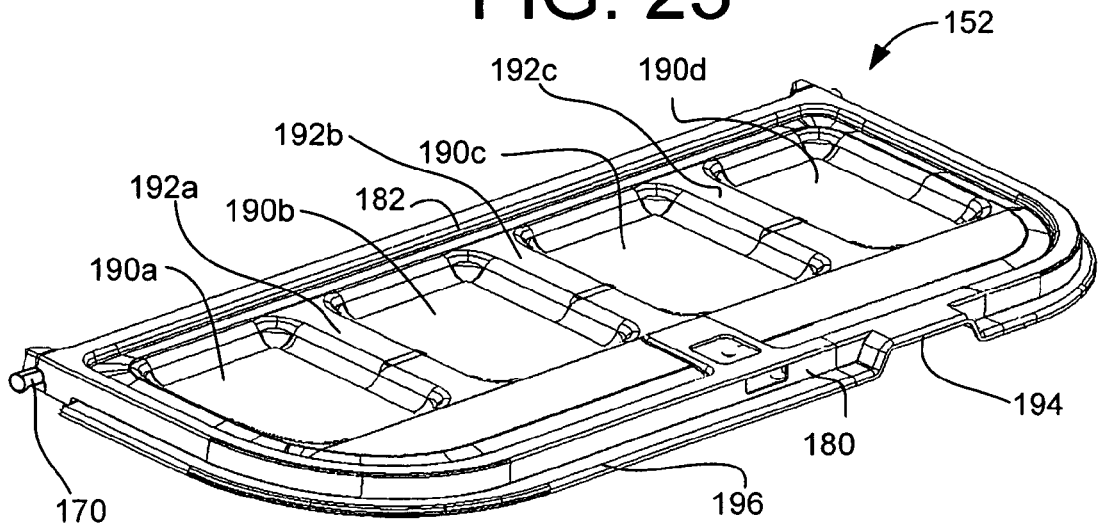
FIG. 23 is a perspective view of the compartment divider in accordance with the second embodiment of the present invention.

The compartment divider 152 is now described with reference to FIGS. 22 and 23. The main body of the compartment divider 152 basically includes a latching end 180, a hinged end 182, a first surface 184 and a second surface (not shown). The latching end 180 includes the latch mechanism 72 described above with respect to the first embodiment. The hinged end 182 has the pivot pins 170 projecting outwardly from opposite side edges. The first surface 184 includes a large recess 186 defined by an outer ridge 188.

The large recess 186 that has some of the features of the recess 74 of the first embodiment. For example, the large recess 186 is surrounded by the outer ridge 188 in a manner similar to the outer ridge 75 of the first embodiment. However, the large recess 186 in the first surface 184 is subdivided into four smaller recesses 190a, 190b, 190c and 190d by three ribs 192a, 192b and 192c. Specifically, the large recess 186 extends below the outer ridge 188 as shown in FIG. 23. The smaller recesses 190a, 190b, 190c and 190d extend below the large recess 186 as shown in FIG. 23. Inclusion of the smaller recesses 190a, 190b, 190c and 190d allows for the formation of the three rib portions 192a, 192b and 192c. The three rib portions 192a, 192b and 192c extend from the latching end 180 to the hinged end 182 of the compartment divider 152. The three rib portions 192a, 192b and 192c provide the compartment divider 152 with additional rigidity and strength.

A handle 194 is formed on an outer lip 196 of the compartment divider 152. Specifically, the outer lip 196 extends along three sides of the compartment divider, as is shown in FIG. 23. The handle 194 is an offset portion of the lip 196 that forms a lifting space or recess. Thus, when the compartment divider 152 is in the lowered position, the handle 194 provides a convenient means for lifting the compartment divider 152.

The pivot pins 170 of the compartment divider 172 are now described with reference to FIGS. 17 and 18. The pivot pins 170 include a cylindrical portion 174 and a flat portion 176. The cylindrical portion 174 is dimensioned with a maximum width or diameter $D_4$ that is slightly smaller than the maximum diameter $D_3$ of the curved pivot portion 158 of the mounting slot 156 in the support blocks 154. It should be understood from this disclosure that the diameter $D_4$ need only be slightly smaller than the diameter $D_3$ to allow the compartment divider 152 to pivot on the pivot pins 170 within the mounting slot 156 of the support blocks 154 from the upright position (FIGS. 14, 15 and 19) to the lowered position (FIGS. 16 and 20).

As mentioned above, each of the pivot pins 170 is also formed with the flat portion 176 where the diameter $D_4$ is interrupted. The thicknesses of the pivot pins 170 at the flat portions 176 are dimensioned to a width $W_4$. The width $W_4$ is about the same or slightly smaller than the width $W_3$ between the inner edge 167 and the upper protrusion 162.

Figure 21:
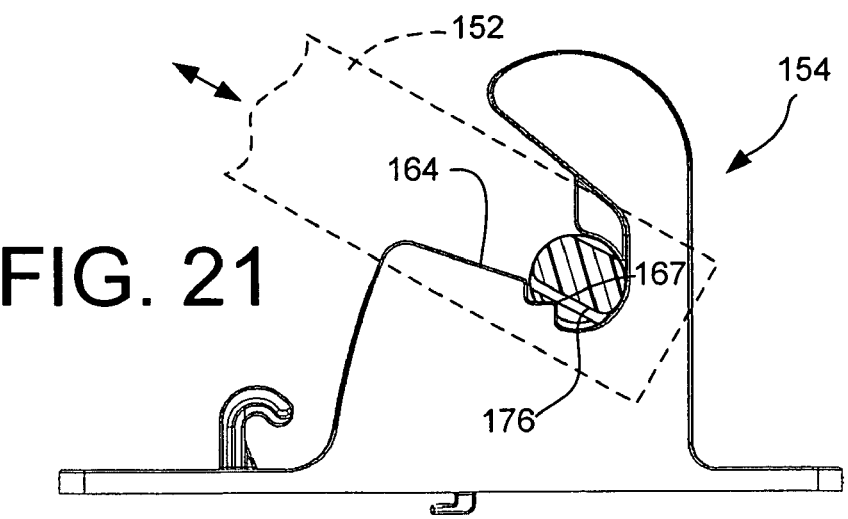
FIG. 21 is a side elevational view similar to FIGS. 19 and 20 of the support block and the compartment divider (in phantom) in the lowered position, in accordance with the second embodiment of the present invention.

As should be understood from the drawings and the description provided herein, the compartment divider 152 can be partially lowered to the orientation shown in dashed lines in FIG. 21. In the orientation in FIG. 21, the flat portions 176 of the pivot pins 170 are space from the inner edges 167 of the lower protrusions 164 such that the compartment divider 152 can be removed from the curved pivot portion 158 of the elongated mounting slot 156. During the installation and removal processes, the flat portions 176 slide along the lower protrusions 164. In this manner, the compartment divider 152 can be removed and installed in the support blocks 154.

Figure 19:
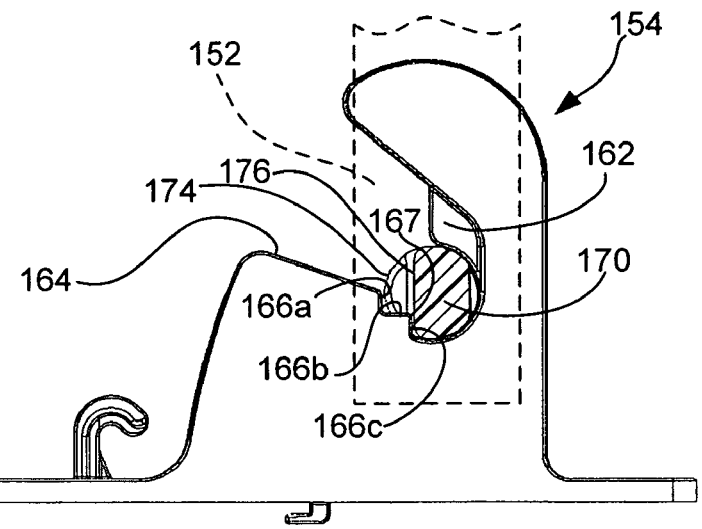
FIG. 19 is a side elevational view of the support block similar to FIG. 14, but showing an opposite side thereof, with the compartment divider shown in phantom in the upright, vertical position, in accordance with the second embodiment of the present invention.
Figure 20:
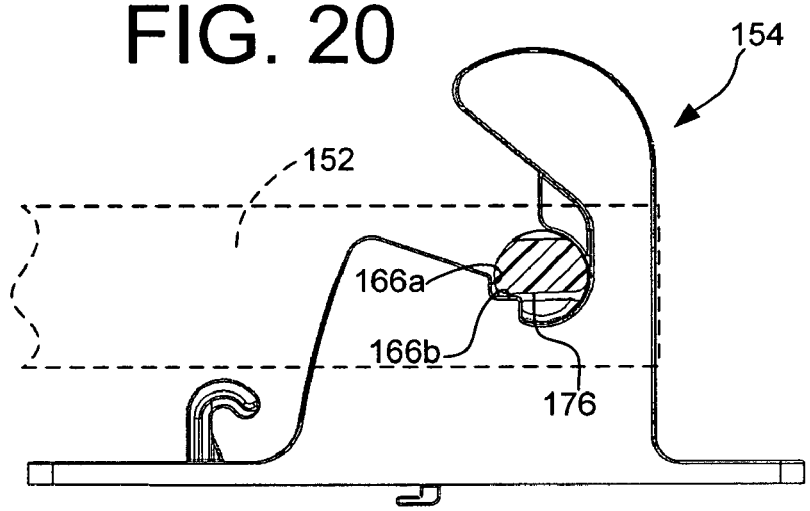
FIG. 20 is a side elevational view similar to FIG. 19 of the support block and the compartment divider (in phantom) in the angled position for removal and/or installation thereof, in accordance with the second embodiment of the present invention.

As shown in FIGS. 15 and 19, a portion of the flat portion 176 engages the surface 166c of the lower protrusion 164 adjacent to and below the inner edge 167 with the compartment divider 152 in the upright vertical position. At the same time, the upper protrusion 162 engages the cylindrical portion 174 of the pivot pin 170. Engagement between the lower protrusion 164 and the flat portion 176 of the pivot pin 170, and engagement between the upper protrusion 162 and the cylindrical portion 174 holds the compartment divider 152 securely in place.

As shown in FIG. 20, another portion of the flat portion 176 engages the surface 166b of the recess 166 with the compartment divider 152 in the lowered horizontal position. At the same time, the upper protrusion 162 engages the cylindrical portion 174 of the pivot pin 170. Engagement between the surfaces 166a and 166b of the recess 166 and the pivot pin 170, and engagement between the upper protrusion 162 and the cylindrical portion 174 restrict movement of the compartment divider 152.

As used herein, the following directional terms "forward, rearward, above, downward, inboard, outboard, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle compartment structure comprising:
   a seatback portion;
   a parcel shelf structure extending rearwardly relative to the seatback portion;
   a vehicle trunk including a trunk lid, a trunk floor and a pair of lateral side walls extending to the seatback portion, with the seatback portion, the parcel shelf structure, the trunk lid, the trunk floor and the lateral side walls defining a storage area; and
   a rigid compartment divider pivotally coupled relative to the trunk floor of the vehicle trunk within the storage area between a first substantially horizontal storage position in which the storage area is substantially unobstructed by the rigid compartment divider and a second substantially vertical dividing position in which the rigid compartment divider partitions the vehicle trunk into two separately concealed spaces, where one of the two separately concealed spaces is partially bounded by the parcel shelf structure, the seatback portion and where the rigid compartment divider and the lateral side walls are contoured to mate with one another such that the two separately concealed spaces are concealed from one another with the rigid compartment divider in the second substantially vertical dividing position.

2. The vehicle compartment structure according to claim 1, wherein
   the rigid compartment divider is coupled to the vehicle trunk by a tool free mounting structure that is configured and arranged such that the rigid compartment divider is removable from the vehicle trunk without using tools.

3. The vehicle compartment structure according to claim 1, wherein
   the rigid compartment divider is arranged in the vehicle trunk such that the trunk lid is arranged to access a first one of the separately concealed spaces and the seatback portion folds down to access a second one of the separately concealed spaces.

4. The vehicle compartment structure according to claim 1, wherein the rigid compartment divider further includes at least one cargo hook.

5. The vehicle compartment structure according to claim 1, wherein
   the rigid compartment divider is pivotally mounted to the trunk floor by a mounting structure that is configured and arranged such the rigid compartment divider is removable from the vehicle trunk when in an intermediate position between the horizontal storage position and the second substantially vertical dividing position.

6. The vehicle compartment structure according to claim 5, wherein
   the mounting structure includes a pair of laterally spaced mounting members attached to the trunk floor of the vehicle trunk adjacent to the lateral side walls, respectively, with the trunk floor being free of any upward projections coupling the rigid compartment divider to the trunk floor between the laterally spaces mounting members.

7. The vehicle compartment structure according to claim 5, wherein
   the mounting structure includes at least one first mounting member on the rigid compartment divider and at least one second mounting member on the trunk floor of the vehicle trunk with one of the first and second mounting members having a slot and one of the first and second mounting members having pivot pin that releasable engages the slot.

8. The vehicle compartment structure according to claim 7, wherein the pivot pin and the slot are dimensioned such that the pivot pin is retained in the slot in both the first substantially horizontal storage position and the second substantially vertical dividing position, and the pivot pin and the slot are further dimensioned such that the pivot pin slide in and out of the slot in a direction generally perpendicular to a pivot axis of the pivot pin when the rigid compartment divider is in the intermediate position.

9. The vehicle compartment structure according to claim 8, wherein
   the pivot pin includes a circumferential surface that is interrupted by a flat portion to allow removal of the pivot pin from the slot when the rigid compartment divider is in the intermediate position.

10. The vehicle compartment structure according to claim 9, wherein
    the mounting structure is adjacent the lateral side walls, with the trunk floor being free of any upward projections coupling the rigid compartment divider to the trunk floor between the mounting structure.

11. The vehicle compartment structure according to claim 9, wherein
    the slot includes a pivoting portion with an arcuate surface configured to pivotally support the pivot pin, and a pair of parallel release surfaces spaced apart from one another by a distance smaller that a maximum diameter of the pivot pin.

12. The vehicle compartment structure according to claim 11, wherein
    the flat portion of the pivot pin is arranged to be generally parallel to the release surfaces of the slot when the rigid compartment divider is in the intermediate position.

13. The vehicle compartment structure according to claim 1, wherein
    the rigid compartment divider further comprises a latch mechanism engagable with the parcel shelf structure that at least partially defines the storage area within the vehicle trunk, the latch mechanism selectively retaining the rigid compartment divider in the second substantially vertical dividing position.

14. The vehicle compartment structure according to claim 13, wherein
    the latch mechanism is configured to be operable from both of the two separate spaces of the vehicle trunk When the rigid compartment divider is in the second substantially vertical dividing position.

15. The vehicle compartment structure according to claim 14, wherein
    the rigid compartment divider is arranged in the vehicle trunk such that the trunk lid is arranged to access a first one of the separately concealed spaces and the seatback portion folds down to access a second one of the separately concealed spaces.

16. The vehicle compartment structure according to claim 1, wherein
    the rigid compartment divider includes at least a water resistant side panel surface that faces upwardly when the rigid compartment divider is in the first substantially horizontal storage position.

17. The vehicle compartment structure according to claim 16, wherein
    the water resistant side panel surface of the rigid compartment divider includes a recess shaped to hold water when the rigid compartment divider is in the first substantially horizontal storage position.

18. The vehicle compartment structure according to claim 17, wherein
    the recess on the water resistant side panel surface of the rigid compartment divider covers a majority of one side of the rigid compartment divider.

19. The vehicle compartment structure according to claim 13, wherein
    the latch mechanism includes a latching striker engagable with a portion of the parcel shelf structure when the rigid compartment divider in the second substantially vertical dividing position.

20. The vehicle compartment structure according to claim 1, wherein
    the rigid compartment divider and the trunk floor are configured and dimensioned relative to each other such that a lower edge of the rigid compartment divider forms an abutment extending upwardly relative to the trunk floor when the rigid compartment divider is in the first substantially horizontal storage position.

21. The vehicle compartment structure according to claim 1, wherein the rigid compartment divider includes a top peripheral edge that contacts the trunk floor when in the first substantially horizontal storage position, with the top peripheral edge has an offset portion spaced above the trunk floor to form a lifting recess between the offset portion and the trunk floor when the rigid compartment divider is in the first substantially horizontal storage position.

22. The vehicle compartment structure according to claim 1, wherein the rigid compartment divider includes a first side having a first recess formed in a lower end portion of the rigid compartment divider near a pivot axis of the rigid compartment divider, and a second side having a second recess in an upper portion of the rigid compartment divider remote from the pivot axis with the first and second recesses lying in a plane parallel to the first and second sides and bisecting the rigid compartment divider.

23. The vehicle compartment structure according to claim 22, wherein the second recess includes at least one cargo hook confined within the second recess such that the cargo hook is spaced apart from the trunk floor when the rigid compartment divider is in the first substantially horizontal storage position.

24. The vehicle compartment structure according to claim 22, wherein the first side is arranged to face upwardly when the rigid compartment divider is in the first substantially horizontal storage position and the second side is arranged to face downwardly when the rigid compartment divider is in the first substantially horizontal storage position.

25. A vehicle compartment structure comprising:

a seatback portion arranged to move between a seating position and a storage accessing position;

a vehicle trunk including a trunk lid, a trunk floor and a pair of lateral side walls extending to the seatback portion, with the seatback portion, the trunk floor and the lateral side walls at least partially defining a storage area;

a rigid compartment divider pivotally coupled relative to the trunk floor of the vehicle trunk within the storage area between a first substantially horizontal storage position and a second substantially vertical dividing position in which the rigid compartment divider partitions the vehicle trunk into two spaces, with the trunk lid being arranged to access a first one of the spaces and the seatback portion being arranged to fold down to access a second one of the spaces; and a latch mechanism configured to be operable from both of the two spaces of the vehicle trunk when the rigid compartment divider is in the second substantially vertical dividing position.

\* \* \* \* \*

UNITED STATES PATENT AND TRADEMARK OFFICE
CERTIFICATE OF CORRECTION

PATENT NO.       : 7,281,742 B2                                       Page 1 of 1
APPLICATION NO.  : 11/046860
DATED            : October 16, 2007
INVENTOR(S)      : Terrence Porter II, et al.

It is certified that error appears in the above-identified patent and that said Letters Patent is hereby corrected as shown below:

On The Title Page Item (75) Inventors from

"Inventors:              Terence Porter, II, Wesland, MI(US);
                         Koshorkumar M. Kale, Farmington Hills, MI(US);
                         Ryan Rumberger, Canton, MI(US)"

to

-- [75] Inventors:       Terence Porter, II, Wesland, MI(US);
                         Kishorkumar M. Kale, Farmington Hills, MI(US);
                         Ryan Rumberger, Canton, MI(US) --

Signed and Sealed this

Eleventh Day of December, 2007

JON W. DUDAS
*Director of the United States Patent and Trademark Office*